US005515372A

United States Patent [19]

Porter

[11] Patent Number: 5,515,372

[45] Date of Patent: May 7, 1996

[54] METHOD AND APPARATUS FOR RADIO DATA CONTROL

[75] Inventor: Brett G. Porter, Somerset, N.J.

[73] Assignee: Modulation Sciences, Inc., Somerset, N.J.

[21] Appl. No.: 210,918

[22] Filed: Mar. 21, 1994

[51] Int. Cl.$^{6}$ .................... H04J 3/00

[52] U.S. Cl. .................... 370/77; 370/84; 370/100.1; 370/110.1; 455/45

[58] Field of Search .................... 370/77, 27, 100.1, 370/61, 85.13, 84, 110.1; 455/45, 46, 186.1, 186.2; 381/2, 3, 6, 14

[56] References Cited

U.S. PATENT DOCUMENTS

| | | | |
|---|---|---|---|
| 4,047,246 | 9/1977 | Kerllenevich et al. | 370/27 |
| 4,471,480 | 9/1984 | Haussmann et al. | 370/84 |
| 5,063,610 | 11/1991 | Alwadish | 455/45 |
| 5,214,792 | 5/1993 | Alwadish | 455/45 |
| 5,239,540 | 8/1993 | Rovira et al. | 370/77 |
| 5,276,679 | 1/1994 | McKay et al. | 370/100.1 |
| 5,369,704 | 11/1994 | Bennett et al. | 370/110.1 |

*Primary Examiner*—Douglas W. Olms
*Assistant Examiner*—Shick Hom
*Attorney, Agent, or Firm*—Regina Ann Loughran

[57] ABSTRACT

RDS data broadcast method and apparatus is disclosed that provides dynamic sequencing and parallel formating to improve access to and the reliability of Radio Data System (RDs) services. Dynamic sequencing permits receivers not adapted to display the textual information that is broadcast as radiotext under the RDS standard to display that radiotext information, automatically.

Dynamic control of complex day-parting schedules minimizes data selection and coding errors and delays, provides priority access to the station's data channel and provides transparent scheduling of real-time data entries, while protecting against losses of real-time entries through overflow.

19 Claims, 2 Drawing Sheets

METHOD AND APPARATUS FOR RADIO DATA CONTROL

BACKGROUND OF THE INVENTION

1. Field of the Invention

The present invention pertains to multiplexed broadcast communications. More specifically, the present invention pertains to RDS broadcast control.

2. Discussion of Related Art

According to the present United States RBDS Standard of the National Radio Systems Committee (NRSC) dated Jan. 8, 1993 (The RDS Standard) Radio Data System (RDS) signals are a multiplexed data subcarrier on FM broadcast signals. The frequency of the subcarrier used by these RDS stations in the FM broadcast band is the third harmonic of the standard, nominally 19 khz, stereo pilot tone. The subcarrier is transmitted as a suppressed-carrier signal that is two-phase-shift-keyed (2 PSK) encoded to prevent audible interference with the operation of phase-locked-loop FM stereo decoders.

RDS data subcarriers are inaudible to radio listeners, providing supplemental visual displays and data services such as e-mail and paging to RDS-equipped radio receivers. The additional data that RDS stations broadcast on this subcarrier can increase their profitability by increasing the variety of broadcast services they provide and attracting additional listeners. Work on AM-band RDS standards for the United States is in progress.

RDS is potentially an important asset for both commercial and public broadcast channels. At the minimum, RDS facilitates tuning, improving travelers' ability to find related stations and similar program material as stations pass out of their receivers' range. RDS also simplifies channel selection for home-based receivers, as well as providing supplemental data services.

The RDS Standard breaks the data encoded on the RDS data subcarrier into 104-bit data segments called "groups". These segments are applied sequentially to the RDS subcarrier, without gaps, at a rate of about 686 code groups each minute. Segments containing different types of data have respective, specified code-group formats. The current United States NRSC Standard for RDS broadcasting defines 12 basic types of code-group formats.

Each data segment is a code group having four 26-bit code blocks. Each block contains a 16-bit information word followed by a 10-bit checkword that varies with an offset value that indicates the type and the location of that block within its group. Receivers apply the checkword to a particular binary matrix to assure decoder synchrony and verify the decoded data, preventing data communication errors.

All RDS code groups include a Program Identification block, a Program Type block and two variable data blocks. The Program Identification block contains a pi code that uniquely identifies the station. The Program Type block contains a Group Type Code and a Program Type Code (pty).

The Group Type Code, specifies what code format the receiver must use to interpret the code group. The pty code describes the station's audio program material. The pty code is used by RDS receivers to find a station broadcasting the type of audio program that the listener wants to hear: Sports, Talk, News, Top 40, Country, Jazz, Classical, etc. A pty code is selected by listeners, using whatever input means is provided by their RDS receivers, to automatically tune their radios to a desired type of program. The pty code only affects receiver tuning when the listener seeks another type of audio program.

Although the data broadcast by RDS stations changes from minute to minute and the pty code changes whenever the audio program material changes, the pi code is included in every code group and any change in the pi code causes RDS radio receivers to automatically tune out! A minor coding error but an unacceptable risk, a major problem. Thus, manual coding of RDS data changes is not a practical option.

The most basic RDS group format, TYPE 0, is the format that supplies most of the automatic tuning and switching information to RDS receivers. Each TYPE 0 code group also includes alphanumeric character codes commonly used for displaying eight-character station or network logos on RDS receivers.

The TYPE 0 display characters are transmitted in pairs as an eight-bit Program Service (ps) code. The NRSC standard ps display is a sequence of four pairs of characters broadcast in four different TYPE 0 groups. Each pair in the sequence has a separate two-bit address code C1, C0 that indicates which character pair is in the given TYPE 0 group.

Each TYPE 0 group also includes a TA switch bit that indicates whether a traffic announcement is being broadcast. Receivers use the TA switch bit as an automatic station locator criterion. RDS-equipped receivers can also be set to interrupt a cassette or CD player when the receiver detects the TA switch bit, so that the driver can hear traffic information clearly, regardless of when it is broadcast. However, if there is a delay in restoring the TA switch bit to zero, listeners will tune out rather than let their cassette or CD players be idled by the station's programming error. This feature of RDS receivers is thus both a convenience and a complication that is a potential source of problems for RDS stations.

TYPE 2 groups supply "radiotext". Radiotext is a message, up to 64 characters long, that is displayed by some RDS receivers. The message may contain any supplemental alphanumeric information that the radio station wishes to have displayed, for example: artist and repetoire, phone numbers, etc. It is potentially a valuable listener service.

However, TYPE 2 code groups are only decoded and displayed by RDS receivers that fully comply with the NRSC standard, and compliance with NRSC receiver standards is voluntary in the United States. Thus TYPE 2 decoding has not been implemented on many less-expensive receivers. These non-compliant, stripped-down receivers reduce the value of RDS services to broadcasters and listeners alike, in that it prevents RDS stations from introducing their listeners to significant RDS services.

The radiotext problem is circular: 1) If listeners can only use RDS receivers for station selection, RDS will do little to increase a station's radio audience, or revenues. Few stations will invest in RDS equipment. 2) If few stations broadcast RDS services, an RDS receiver offers less benefit to travellers and other listeners, and fewer will buy RDS receivers. In the United States, in particular, RDS broadcasting is caught in this conundrum, and it undermines the health of the industry.

RDS requires advanced schedule management and code sequence control, far beyond the level required for audio program schedules, if the benefits of RDS are to be fully realized. In addition to the tuning and data displays noted above, RDS stations can provide numerous other kinds of data services, effectively simultaneously. TYPE 9 groups that produce channel-addressed or general voice-sampled emergency alert data, TYPE 3 navigational aid groups and the "transparent" data services: the in-house communications TYPE 6, and the leased data service TYPE 5 and paging service TYPES 1 and 7 groups. The schedule management required for efficient encoding and time-division multiplexing of RDS data is, thus, orders of magnitude more complex than many broadcasters have dealt with heretofore.

Also, flexible code group sequencing is needed because the access and day-parting requirements for these additional RDS services are very diverse. RDS material such as traffic announcements and emergency warnings require immediate insertion into the broadcast signal, as well as higher group repetition rates to assure rapid detection by RDS receivers. RDS paging, on the other hand, requires that certain code groups be broadcast in an invariant time sequence. Furthermore, the volume of paging data and in-house and leased transparent data is likely to vary with time but these services are, preferrably, not time-limited. These additional data channels are, therefore, apt to overflow.

Attempting to superimpose these additional, highly variable and time-sensitive RDS data services onto pre-defined RDS schedules using scheduling routines developed for a station's audio programming, would push the station's RDS scheduling to the brink of collapse. Those routines lack the necessary editing, sequencing and encoding control capability. However, because RDS broadcast services are relatively new in this country, there is limited capital available for RDS projects. RDS systems must be compatible with existing capital equipment, as much as possible. Computer hardware already providing transmitter logging and control may also have the capacity to provide RDS data editing, sequencing and encoding in accordance with the present invention.

SUMMARY OF THE INVENTION

RDS radio broadcast apparatus in accordance with the present invention having a modulator providing coded information on a subcarrier that is inaudible to the radio station's listeners comprises an encoder routine that encodes the information and a sequencer routine that time-division multiplexes a plurality of data segments into said information. The data segments are given static assignments within a given time unit in accordance with a segment mix table.

Variable data is assigned to given data segments at predetermined points in time by an editor routine in accordance with a predetermined reassignment list. The sequencer routine supersedes data designated for a given time unit by static assignments, with data designated for that time unit by dynamic assignments.

Time unit assignments in accordance with the present invention permit real-time data input, while preventing such things as pi and TA code bit errors. This dynamic scheduling feature also provides the flexibility necessary to coordinate diverse scheduling requirements, preventing timing errors and overflow losses.

In a particular embodiment the sequencer routine assigns variable display text to time units in accordance with a radiotext duration value. In a preferred embodiment, display text is supplied to both radiotext data segments and station data segments within a given time unit. The editor routine subdivides a copy of the open text into sequential portions, and the sequencer routine automatically assigns these sequential portions of the open text to sequentially-addressed station data segments and assigns the station data segments to time units in accordance with a scroll-time value.

This "long-ps" feature of the present invention automatically supplies selected radiotext messages to receivers that are not equipped to display TYPE 2 groups. However this supplemental, long-ps RDS display is also compatible with the radiotext displays of the fully-compliant RDS receivers.

BRIEF DESCRIPTION OF THE DRAWINGS

The features and advantages of the present invention will be better understood when the detailed description of a preferred embodiment given below is considered in conjunction with the drawings provided, wherein.

In these figures, similar reference numerals indicate similar structures.

DETAILED DESCRIPTION OF A PREFERRED EMBODIMENT

Figure 1:
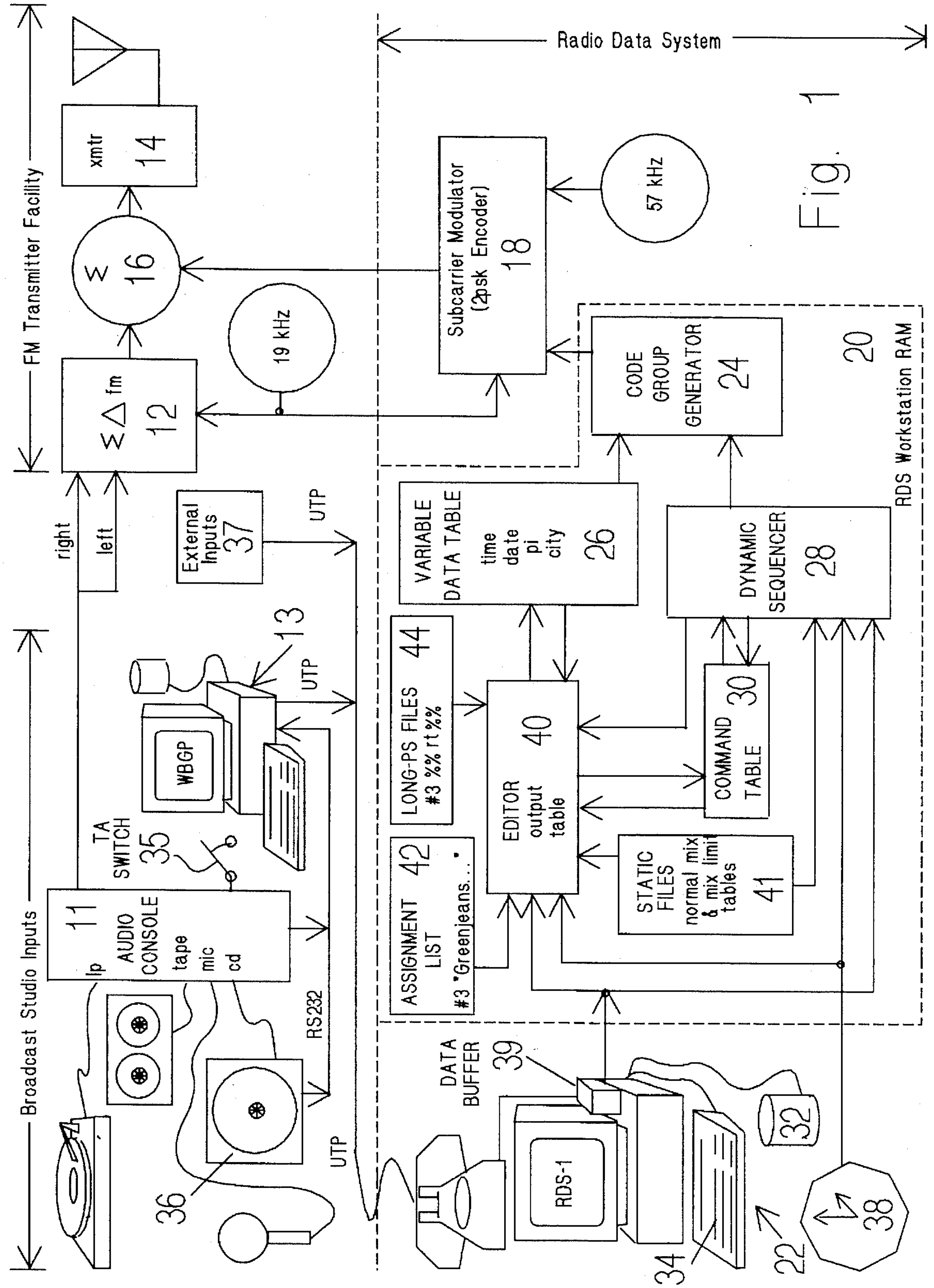
FIG. 1 is a schematic diagram of an RDS stereo FM broadcast system in accordance with the present invention.

FIG. 1 shows a broadcast studio 10 in a typical FM station, we'll call it "WBGP", having an on-air console 11. The console 11 selectably provides stereo audio program material from any of a diverse array of inputs to an FM stereo encoder 12. The encoded program material is supplied to the FM transmitter 14 through a mixer 16 which adds the RDS subcarrier, a 57 kHz two-phase-shift-keyed (2 PSK) signal produced by the RDS modulator 18, as is well-known in the art.

There is also a conventional studio automation computer 13. This computer controls and monitors various audio program scheduling functions so that the station operator is assured of meeting the station's day-parted schedule commitments, and transitions between the program sources available to the air console 11 are as smooth as possible. In RDS stations, there are additional commitments for RDS listener services and leased data channels that must be coordinated and monitored.

The screen of the studio computer 13 displays impending on-air events, the station's schedule and the artist, title and catalogue number that is digitally recorded on each CD that is played, to guide the station operator, as is known in the art.

The RDS material broadcast by the transmitter 14 is assembled and encoded by RDS executable code resident in the RAM memory 20 of a dedicated RDS control computer workstation 22. Preferably, the RDS workstation 22 is one of the well-known DOS/IBM compatible computers having an Intel i286™ model processor and MS-DOS version 3.3, or higher. During the broadcast day, the RDS routines and files are in RAM memory 20 that is operated as a virtual "RAM disk" drive. For coordination with transmitter logging and control, the RDS workstation should have an Intel i486™ model processor and MS-DOS version 6.0, or higher. The RDS workstation 22 coordinates stored and real-time RDS data, and provides scheduling information and control options at the studio 10 through the studio automation computer 13.

The RDS-format code groups that are broadcast by the station are automatically assembled by a code group generator routine 24 using data copied from a CURRENT VALUE TABLE 26, a table consisting of named data fields that hold variable data, such as "time=_" and "date=_". The transfer of data by the code group generator 24 from the CURRENT VALUE TABLE 26 in accordance with the present invention is controlled by the dynamic sequencer routine 28.

STATIC ASSIGNMENTS

Changes to the information in the CURRENT TABLE 26 are initiated the editor routine 40 in accordance with the COMMAND TABLE 30. The COMMAND TABLE 30 provides a list of reassignments of the data transmitted in given code group TYPES. The COMMAND TABLE 30 is loaded into working RAM 20 from the hard disk drive 32 of the workstation 22, with the RDS software routines and other RDS files, at the beginning of the broadcast day. This process can be initiated by commands entered at the keyboard 34 of the RDS workstation 22 or transmitted over an RS-232 cable, if the studio 10 is close-by, or the unshielded twisted pair (UTP) of a modem link.

The CURRENT TABLE 26 for the new day is built up in accordance with a NORMAL MIX TABLE and default data and text stored in the STATIC FILE 41. Any reassignments scheduled in the COMMAND TABLE 30 for the current time of day given by the system clock 38 are then substituted in by the editor routine 40, including text from the from the RADIOTEXT FILES 42 and LONG-PS FILES 44.

Real-time Commands and Data

Commands and data can also be entered in real-time from the RDS workstation 22, or from remote sources. For example, the CD player 36 that reads digital CD artist, title and catalogue number data, the keyboard of the studio computer 13 or the TA switch 35 on the air console 11 in the studio 10, may provide data or commands at any time over the RS-232 cable or modem link. All real-time data entries from the studio 10 and any outside sources 37 are stored in respective data buffers 39 that are monitored by the dynamic sequencer 28.

For example, if the station leases RDS paging service channels or a transparent data service channel, the RDS workstation will have respective buffer memory areas 39 for receiving the real-time pager and transparent data entries. This real-time data is transferred from the respective buffer 39 to locations in the FILES 41, 42, 44 and the CURRENT TABLE 26 by the editor routine 40, under the control of the dynamic sequencer routine 28.

During the course of the broadcast day, the editor routine 40 transfers data from the COMMAND TABLE 30, the RADIOTEXT FILES 42 and the LONG-PS FILES 44 into assigned locations in the CURRENT TABLE 26 under control of the dynamic sequencer routine 28 and the COMMAND TABLE 30. The dynamic sequencer routine 28 also monitors the condition of the data buffers 39 and responds selectively to real-time commands received from the RDS computer keyboard and from remote sources, as explained below.

Code Generation

The code group generator routine 24 produces eleven code groups each second. To assure that each group is detected by all RDS receivers, each group should be repeated at least twice each minute. In the preferred embodiment, the desired repetition frequency for each code group TYPE in each of 30 2-second periods each minute is set by values entered in a NORMAL MIX TABLE in STATIC FILE 41:

NORMAL MIX TABLE

| TYPE # | 0 | 1 | 2 | 3 | 4 | 5 | 6 | 7 | 9 | 10 | 14 | 15 |
|---|---|---|---|---|---|---|---|---|---|---|---|---|
| #/sec. | 4 | 0 | 2 | .5 | 0 | 2 | 0 | .5 | 0 | 0 | 0 | 0 |

The TYPES listed in this MIX TABLE are assigned to 22 "Bins" in an OUTPUT TABLE constructed and held in RAM by the editor routine 40. If the sum of the second line of the MIX TABLE is less than 11 there will be at least one unassigned Bin in the OUTPUT TABLE:

OUTPUT TABLE

| Bin # | 00 | 01 | 02 | 03 | 04 | 05 | 06 | 07 | 08 | 09 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| TYPE # | 0 | 2 | * | 0 | 2 | 7 | 0 | 5 | * | 0 | 2 | 5 | 0 | 5 | 2 | 0 | 3 | * | 0 | 2 | 5 | 0 |

The "*" indicates that the Bin is unassigned. Unassigned Bins and Bins having null-value data are filled dynamicaly, as is explained below. An operator-defined FILLER TYPE is stored in the STATIC FILE 41. If the FILLER also has null-value data the DEFAULT TYPE, TYPE 15, is substituted.

A CLOCK FLAG held in the CURRENT TABLE 26 in RAM is initially set to a value that is also stored in the STATIC FILE 41, a value selected by the station operator. However, when the station operator sets the TYPE 7 group frequency to a non-zero value in the MIX TABLE, the CLOCK FLAG and a PAGING FLAG in the CURRENT TABLE 26 are both automatically set "on" by the editor routine 40 Dynamic Sequencing.

The flexible real-time data flow and automated parallel multiformat data group generation provided by dynamic sequencing in accordance with the present invention are explained further below.

Figure 2:
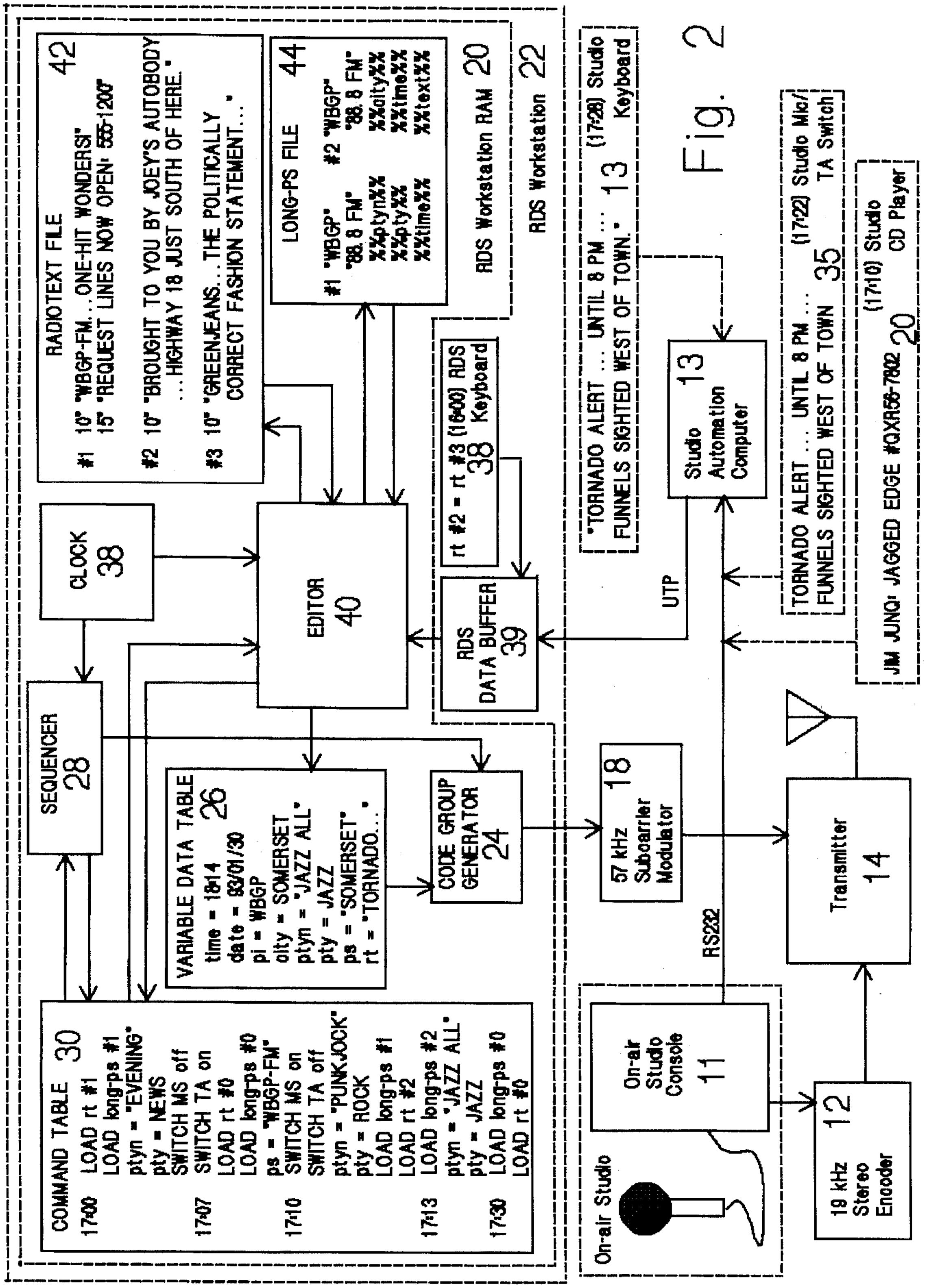
FIG. 2 is a data flow diagram for RDS group generation in accordance with the present invention.

FIG. 2 illustrates diverse modes of data access provided in accordance with the present invention. Standard automated operations defined by the CURRENT TABLE 26 are modified by the COMMAND TABLE 30. The portion of the COMMAND TABLE 30 shown begins at 17:00:00 military time and specifies, minute-by-minute, the reassignments of data to the CURRENT TABLE 26 that provide listeners with up-to-the-minute RDS tuning and display services for the station's audio program schedule.

It is now 6:14 p.m. in FIG. 2. The text for Radiotext File #2 in the CURRENT TABLE 26 was reassigned at 4:00 p.m. However, static assignments have been further superseded by a real-time tornado warning. The keyboard text entry has now totally replaced both File #3 and File #2. The warning was entered with instructions to repeat the warning for 60 seconds at 15 min. intervals. The warnings will automatically repeat, but the station will also be able to satisfy its commitment to include File #3 in the RDS display between now and 8 o'clock p.m.

The COMMAND TABLE 30 only lists reassignments, however, scheduled changes to the CURRENT TABLE. The OUTPUT TABLE defines the complete RDS schedule of static assignments, which also include TYPE 3 location data, TYPES 1, 4 and 7 for radio paging and TYPE 5 in-house transparent data. Blocks of TYPE 9 emergency data groups may also be inserted into the OUTPUT TABLE at any time in response to real-time data inputs.

The combination of RDS real-time display data entries and paging and transparent data entries, as well as traffic announcement switching and emergency data, imposes a substantial additional scheduling burden on the broadcaster. RDS standards require immediate insertion of the traffic announcement TA switch bit signal, and of emergency data code groups. RDS paging channel control requires a specific, second-by-second, RDS broadcast schedule. Furthermore, the real-time data is subject to overflow unless dynamically allocated within the RDS broadcast schedule.

To assure that the TA switch bit is immediately detected by all receivers, a block of eight TYPE 15 groups is inserted immediately at the beginning of each traffic announcement. RDS Stations that provide EON (enhanced other network) traffic news from related stations in adjacent broadcast areas, also insert a block of eight TYPE 14 groups at the beginning of each traffic announcement on the related station, in response to a signal received from that remote source 37. Thereafter, TYPE 14 or 15 groups are dynamically inserted at least twice each minute during the traffic announcement, until the TA FLAG in the STATIC FILE 41 is turned to "off". RDS standards permit the TA switch bit to mute all other audio sources for the duration of the traffic announcement. EON-compatible RDS receivers may also automatically be switched to that EON channel for the duration of the EON announcement.

RDS paging, on the other hand, requires a TYPE 4 time and date group to be encoded at the beginning of each minute and a TYPE 1 group every second thereafter, without fail. TYPE 1 code groups control the reception of up to 100 time-division-multiplexed pager groups. The TYPE 7 code groups then provide discrete messages for up to 10,000 pager channels within each of those groups.

Suitably-equipped receivers use TYPE 9 data for transmitting channel-addressed data to emergency services teams or to select sampled-voice sequences providing auditory messages that override all other audio material. In the event of an emergency, TYPE 9 groups must supersede all other scheduled RDS services, but in an orderly fashion so that the superseded real-time material is delayed rather than lost. Dynamic sequencing permits orderly reassignment of real-time data superseded by this TYPE 9 emergency service, while continuing to update static assignments to the CURRENT TABLE 26 in accordance with the COMMAND TABLE 30.

"Hot-clock" Dynamic Scheduling

Dynamic sequencing that coordinates RDS services also assures the accurate coding of more complex day-parted station program schedules. "Hot clock" minute-by-minute RDS scheduling permits the Program Type (pty) code, a Program-item Number (pin) identifying a particular listener-selectable audio program in the station's schedule, and the Music/Speech (M/S) and Traffic switch bits (TA and EON) to change every 60 seconds, if need be.

Clearly, detailed, up-to-date pty, pin, TA, and M/S coding increases the practical value of the RDS tuning service to the station's listeners. Listeners want to find the pin program or the pty, TA, or M/S type of material they choose: not news or announcements when what they've asked for is easy-listening, not top-40 tunes or a championship game when they're looking for a traffic report. For the RDS automatic tuning function to be accepted by listeners, the RDS codes must be precisely timed!

"Long-PS" Parallel Group Generation

Secondly, perhaps even more important to the future of RDS broadcasting, is parallel data group format generation for radiotext. The LONG-PS FILES 44 automatically provide radiotext to stripped-down RDS receivers that are not equipped to display radiotext data. This increases the value of RDS transmissions both to the public and to the broadcaster, as discussed above with reference to the background of the invention.

Each entry in the RADIOTEXT FILES 42 has a stated duration. For example, in FIG. 2, the two entries in Radiotext File #1 will be repeated for 15 and 10 seconds, respectively.

Radiotext messages are entered into the RADIOTEXT FILES 42, without reference to which Group format will be broadcast. Code-group format and sequence is determined on-the-fly for these entries whether they are to be broadcast immediately, as real-time data, or stored in the RADIOTEXT FILES 42. The difference between the RDS formats providing 64 characters 3 times a second in TYPE 2A groups, but 32 characters 6 times a second in TYPE 2B groups, for instance, is transparent to the operator. The operator merely enters radiotext and its duration value. The parallel generation of Long-PS codes with the Radiotext codes within the same 2-second time unit is transparent to the operator who enters the radiotext.

According to the OUTPUT TABLE shown above, multiple radiotext (TYPE 2) and PS (TYPE 0) data groups are broadcast every two seconds. Every entry in a Long-PS File is repeated for a period defined by a SCROLL-TIME VALUE set by the operator in the STATIC FILE 41. When a %%text%% code is reached in the Long-PS File listed in the CURRENT TABLE 26, the editor routine 40 copies the radiotext listed in the CURRENT TABLE 26 into a LONG-PS BUFFER in the LONG-PS FILES 44 and subdivides that copy into the first of a series of sequential portions that are eight characters long.

To subdivide the radiotext, the editor routine searches backward from the eighth character for a blank character where it can subdivide the copied radiotext. The editor then pads out that subdivision with as many blank characters as needed to provide eight characters in that portion, and inserts that first portion into the CURRENT TABLE 26. The editor then moves ahead another eight characters into the remainder of the copied radiotext and repeats the search and pad process.

The sequencer routine 28 assigns two-character nibbles of the portion in the CURRENT TABLE 26 in sequence to sequentially-addressed TYPE 0 code groups and assigns the next portion of said copy to the CURRENT TABLE 26 at an interval set by the SCROLL-TIME VALUE. Thus each portion of the copied Radiotext is repeated as though it were a separate entry in the given Long-PS File.

In FIG. 2 it is 6:14 p.m. Tornados hit town earlier in the evening, resulting in an unscheduled traffic announcement at 17:22 read over the air using the TA switch 35 on the console. The audible warning was followed by a keyboard entry of the same information as radiotext at 17:28. The keyboard entry will be automatically displayed as radiotext and as part of the Long-PS display, for the benefit of RDS receivers that are not equipped to display radiotext.

Dynamic Assignments

Before the code for the group in the next bin on the OUTPUT TABLE is generated, the sequencer routine 28 determines the current time. At the beginning of each minute, the OUTPUT TABLE is restarted at bin #00; a TYPE 4 group is also inserted at the top of the minute, if the CLOCK or PAGING FLAG is set "on". At the beginning of each second thereafter, a TYPE 1A group is selected and the next Bin in the OUTPUT TABLE is passed over, if the PAGING FLAG is set "on". Because there are slightly more than 22 groups every two seconds, a different Bin is passed over each time TYPE 1 is selected.

If neither a minute nor second boundary is detected, the routine selects the group TYPE stored in the next OUTPUT TABLE bin. If that Bin is unassigned, or the data has a null value because input is absent or because the assigned data is not ready for the CURRENT TABLE 26, the group TYPE is selected dynamically, as follows: 1) the readiness of the operator-designated FILLER TYPE is checked, and 2) if that FILLER TYPE is ready, it replaces the TYPE in this Bin this one time, and 3) if that FILLER TYPE has a null value, the DEFAULT VALUE is substituted for it. The DEFAULT TYPE is independent of variables that require the kind of multi-stage processing that can delay the entry of the Long-PS text portions described above into the CURRENT TABLE 26.

The sequencer routine then moves on to the next Bin and tests to see whether it can generate a group of the selected TYPE. However, the TYPES in Bins of the OUTPUT TABLE that are passed over in this way will be again tested for use in the next 2-second interval, if not sooner.

Dynamic, statistical sequencing of the RDS TYPES broadcast protects parallel group generation from disruption by the delays encountered in subdividing Long-PS text. Because the desired frequency with which groups are broadcast each minute is predetermined, rather than their actual sequence, the sequencer routine maintains order in the data flow, despite variable data volume, competing data priorities and delays.

Real-time Overflow Protection

The RDS input lines should appear in real-time as a simple wire with a given data rate: without RDS scheduling or coding hassles. Conflict resolution between competing realtime data streams within the RDS workstation, and the formating and scheduling requirements of the RDS hardware should be transparent to external sources, such as paging and transparent data channels, particularly when leased channels are involved.

When data levels in one of the real-time data buffers 39 reaches a given highwater mark, indicating that the real-time data could overflow its buffer 39, the dynamic sequencer 28 changes into its overflow mode.

In the overflow mode of operation, the dynamic sequencer 28 causes the editor routine 40 to use an MIX LIMIT TABLE stored in the STATIC FILE 42 in building its OUTPUT TABLE, rather than the NORMAL MIX TABLE. This MIX LIMIT TABLE defines the station's rock-bottom, baseline RDS broadcast needs and commitments, permitting accelerated data transmission from a full real-time data buffer 39:

MIX LIMIT TABLE

| TYPE # | 0 | 1 | 2 | 3 | 4 | 5 | 6 | 7 | 9 | 10 | 14 | 15 |
|---|---|---|---|---|---|---|---|---|---|---|---|---|
| #/sec. | 4 | 0 | 2 | 0 | 0 | 0 | 0 | 0 | 0 | 0 | 0 | 0 |

The sequencing routine returns to the NORMAL MIX TABLE, once the data level in the buffer falls well below the high water mark.

If the data level remains above the high water mark for longer than a predetermined TOLERANCE period, the RDS workstation forces a halt at the source of the data transmission causing the existing highwater condition, to prevent loss of data transmitted to the station. In the preferred embodiment this is done through the handshake protocols of the packet data communications methods used by the RDS workstation 22 to acquire real-time data.

It will be appreciated by one skilled in the art that variations and modifications of the disclosed apparatus are possible within the spirit and scope of this invention. The embodiments described above are provided to illustrate presently preferred ways of making and using this invention. The invention is defined by the claims appended below.

I claim:

1. Apparatus for a broadcast station having a data broadcast subcarrier that is inaudible to the station's listeners and a modulator providing information on the subcarrier, said apparatus comprising:

a data segment mix table, said table listing the frequency with which respective types of data segments are to be multiplexed into the information within a given time unit;

an editor for supplying predetermined types of data to respective types of data segments;

a display assignment list wherein predetermined displays are assigned to respective display-type data segments at respective predetermined times of day; and a sequencer that time-division multiplexes data provided by the editor to a plurality of data segments into the information, said sequencer being responsive to assemble said information in accordance with said data segment mix table and said display assignment list.

2. The apparatus of claim 1 further comprising:

a real-time data input; and a stored-data data input, said editor cooperating with said data inputs to supply real-time data to predetermined types of data segments, and said sequencer supersedes the data for a display assigned at said respective predetermined times in accordance with said predetermined display assignment list with a display from said real-time data input, whereby real-time display data is dynamically scheduled for broadcast.

3. The apparatus of claim 1 further comprising an input buffer for storing real-time data, and a limit table, said mix table being superseded by said limit table in the event of a highwater condition in said real-time input buffer so that more data segments to which real-time data is supplied are assembled into said information, said limit table listing minimum frequencies for respective data segment types, whereby real-time data is selected for broadcast by dynamic assignment and the risk of overflow is reduced.

4. The apparatus of claim 1 wherein the display assignment list further includes a display duration value for each display, and the sequencer assembles a plurality of display-type data segments so that the broadcast of said text display continues during a predetermined period corresponding to said display duration value.

5. The apparatus of claim 1 wherein said data segment mix table lists both radiotext display data segments and station display data segments to be multiplexed within a given time unit.

6. The apparatus of claim 5 wherein said editor makes a copy of said radiotext display and subdivides the copy into portions and said editor supplies characters from sequential portions of said copy of the radiotext display to respective sequential station display data segments, whereby long-PS displays are generated.

7. The apparatus of claim 6 wherein said sequencer assigns characters from said sequential portions of said copy into said respective sequential station display data segments by overriding data previously supplied to said data segments, whereby dynamic scheduling of long-PS displays is provided.

8. The apparatus of claim 2 further comprising a buffer overflow limiter having a predetermined overflow tolerance time, said buffer overflow limiter interrupting said real-time data when a buffer overflow tolerance time has expired.

9. The apparatus of claim 1, said apparatus further comprising:

a long-PS file including lists specifying sequences of data fields; and a station display type of data segment into which data supplied by said editor to said data fields are consecutively inserted by said sequencer in a sequence corresponding to the sequence specified in a given list in said long-PS file, whereby long-PS displays are retrieved.

10. A method of assembling and multiplexing data segments into information used to modulate an inaudible broadcast subcarrier, said method comprising the steps of:

supplying predetermined types of data to respective types of data segments; and assembling a plurality of data segments within a given time unit into the information in accordance with a data segment mix table listing the frequency with which respective types of data segments are to be multiplexed within a given time unit into the information and a display assignment list wherein predetermined displays are assigned to respective display-type data segments at respective predetermined times of day.

11. The method of claim 10 further comprising the sheds of:

supplying real-time data to predetermined types of data segments; and superseding the data for a display assigned at said predetermined times in accordance with said predetermined display assignment list with real-time data, whereby real-time display data is dynamically scheduled for broadcast.

12. The method of claim 10 wherein the display assignment list and a real-time input buffer provide data and displays for said data segments, said method further including the step of:

superseding the mix table with a limit table in the event of a highwater condition in said real-time input buffer so that more data segments in which real-time data is supplied are assembled into said information, said limit table listing minimum frequencies for respective data segment types, whereby real-time data is selected for broadcast by dynamic assignment and the risk of overflow is reduced.

13. The method of claim 10 wherein a given display is repeatedly supplied to display data segments in accordance with a display duration value, so that broadcast of said display continues during a predetermined period corresponding to said display duration value.

14. The method of claim 10 wherein said data segment mix table lists both radiotext display data segments and station display data segments to be multiplexed within said given time unit.

15. The method of claim 14 further comprising the steps of:

copying said radiotext display;

subdividing said copy into portions; and supplying characters from sequential portions of said copy to respective sequential station display data segments, whereby long-PS displays are generated.

16. The method of claim 15 wherein said characters from said sequential portions of said copy are assigned into said respective sequential station display data segments by overriding data previously supplied to said data segments, whereby dynamic scheduling of long-PS displays is provided.

17. The method of claim 11 further comprising the step of interrupting the supply of real-time data when a buffer overflow tolerance time has expired.

18. The method of claim 10 further comprising the steps of:

storing a long-PS file including lists specifying sequences of data fields; and inserting data supplied to said data fields into a station display type of data segment in a sequence corresponding to the sequence specified in a respective list in said long-PS file, whereby long-PS displays are retrieved.

19. A broadcast of data multiplexed in accordance with the method of claim 10.

* * * * *